(12) United States Patent
Yook et al.

(10) Patent No.: US 9,431,029 B2
(45) Date of Patent: Aug. 30, 2016

(54) METHOD FOR DETECTING VOICE SECTION FROM TIME-SPACE BY USING AUDIO AND VIDEO INFORMATION AND APPARATUS THEREOF

(75) Inventors: Dongsuk Yook, Seoul (KR); Hyeopwoo Lee, Gyeonggi-do (KR)

(73) Assignee: Korea University Industrial & Academic Collaboration Foundation, Seoul (KR)

( * ) Notice: Subject to any disclaimer, the term of this patent is extended or adjusted under 35 U.S.C. 154(b) by 175 days.

(21) Appl. No.: 13/203,387

(22) PCT Filed: Feb. 10, 2010

(86) PCT No.: PCT/KR2010/000833
§ 371 (c)(1),
(2), (4) Date: Dec. 7, 2011

(87) PCT Pub. No.: WO2010/098546
PCT Pub. Date: Sep. 2, 2010

(65) Prior Publication Data
US 2012/0078624 A1    Mar. 29, 2012

(30) Foreign Application Priority Data
Feb. 27, 2009  (KR) .................. 10-2009-0017114

(51) Int. Cl.
*G10L 21/0264*  (2013.01)
*G10L 25/78*  (2013.01)
(Continued)

(52) U.S. Cl.
CPC ............... *G10L 25/78* (2013.01); *G10L 17/00* (2013.01); *G10L 2021/02166* (2013.01)

(58) Field of Classification Search
CPC ... G10L 15/20; G10L 25/78; G10L 21/0208; G10L 15/02; G10L 25/87; G10L 15/22; G10L 15/24; G10L 15/25; G10L 15/063; G10L 17/005; G10L 17/02; G10L 15/08; G10L 15/187; G10L 15/30; G10L 15/32; G10L 17/00; G10L 15/265; G10L 21/06; G10L 21/02; G10L 21/0232; G06K 9/6293; G06K 9/00268; G06K 9/685; B60T 8/885; B60T 2270/416; B60T 8/171; F02D 41/222; F02D 41/1454; G05D 1/0272; B60W 50/0205; G05B 19/425; G01B 7/003; B25J 9/1674; G09B 19/04
USPC ............ 701/30.5, 30.7, 30.8, 30.1, 23, 30.3, 701/30.4; 318/568.12, 568.16, 568.24; 704/233, 243, 244, 246, 247, 252, 704/E15.04, E15.041, E15.042, E15.044, 704/E15.045, E15.046, E15.047, E15.049, 704/E17.001, E17.003, E17.015, E21.019, 704/E21.02, 253, 254
See application file for complete search history.

(56) References Cited

U.S. PATENT DOCUMENTS 6,964,023 B2 * 11/2005 Maes et al. .................. 715/811
7,970,609 B2     6/2011 Hayakawa
(Continued)

FOREIGN PATENT DOCUMENTS

| JP | 2008-064733 A | 3/2008 |
| JP | 2008-152125 A | 7/2008 |
| KR | 10-2007 0061056 A | 6/2007 |

OTHER PUBLICATIONS

Benesty, Sondhi and Huang. Springer Handbook of Speech Processing. Springer Berlin Heidelberg. 2008. p. 962-963.*
(Continued)

*Primary Examiner* — Abul Azad
(74) *Attorney, Agent, or Firm* — Alston & Bird LLP

(57) ABSTRACT

The present invention relates to a method for detecting a voice section in time-space by using audio and video information. According to an embodiment of the present invention, a method for detecting a voice section from time-space by using audio and video information comprises the steps of: detecting a voice section in an audio signal which is inputted into a microphone array; verifying a speaker from the detected voice section; sensing the face of the speaker by using a video signal which is inputted into a camera if the speaker is successfully verified, and then estimating the direction of the face of the speaker; and determining the detected voice section as the voice section of the speaker if the estimated face direction corresponds to a reference direction which is previously stored.

16 Claims, 3 Drawing Sheets

(51) Int. Cl.
*G10L 17/00* (2013.01)
*G10L 21/0216* (2013.01)

(56) References Cited

U.S. PATENT DOCUMENTS

| | | |
|---|---|---|
| 2002/0035475 A1* | 3/2002 | Yoda .............................. 704/270 |
| 2003/0177006 A1* | 9/2003 | Ichikawa et al. ............. 704/231 |
| 2006/0241808 A1* | 10/2006 | Nakadai et al. .............. 700/245 |

OTHER PUBLICATIONS

International Search Report for Application No. PCT/KR2010/000833 dated Aug. 25, 2010.
Lee, H. et al., *Distant-Talking of Speech Interface for Humanoid Robots*, The Korean Society of Phonetic Sciences and Speech Technology 2007, Proceedings of the KSPS Conference, May 2007, pp. 39-40.
Written Opinion from International Application No. PCT/KR2010/000833 dated Aug. 25, 2010.

* cited by examiner

METHOD FOR DETECTING VOICE SECTION FROM TIME-SPACE BY USING AUDIO AND VIDEO INFORMATION AND APPARATUS THEREOF

CROSS REFERENCE TO RELATED APPLICATIONS

This application is a national stage application filed under 35 U.S.C. 371 of International Application No. PCT/KR2010/000833, filed Feb. 10, 2010, which claims priority from Korean Application No. 10-2009-0017114, filed Feb. 27, 2009, each of which is incorporated herein in its entirety.

TECHNICAL FIELD

The present invention relates to a signal process, and particularly, to a method and an apparatus for detecting a voice section by using time-space data in a speech recognition field.

BACKGROUND ART

Usually, a robot or a system such as home automation needs to act in response to a person's command by analyzing a signal input during an operation. For realizing this, speaker recognition or voice recognition may be performed by recognizing whether person's voice is included in a signal continuously input to a microphone.

In general, the voice recognition is basically performed by determining the similarity between a reference pattern and a voice pattern to be recognized.

FIG. 1 shows an existing speech recognition system.

The speech recognition system of FIG. 1 includes a voice section detection unit (1) that detects a voice section from an input signal, a characteristic coefficient extraction unit (2) that extracts characteristics from the voice section detected by the voice section detection unit (1) using an MFCC coefficient, a speech recognition unit (3) that recognizes a voice signal using an algorithm of hidden markov model (HMM) and variable multi-section vector quantization (VMS VQ), a database (4) that stores word model parameters learned by the voice signal, and a post-process unit (5) that outputs a word recognized by determining the effectiveness in the voice signal recognized by the speech recognition unit (3).

In the speech recognition system with such a configuration, a pre-process part of the speech recognition system detects an accurate voice section from the input signal, which is a very significant operation as a precondition of determining the performance of the system.

Various techniques have been used as a method for detecting a voice section essential in the voice recognition. In general, the most frequently used method is a method for detecting a voice section using characteristics on a time axis of a voice signal. In other words, the voice signal has high energy at the voice section, has very high similarity between voice samples, and has a minimum voice sustaining time. The voice section is detected by distinguishing background noise and a voice section from each other using characteristics on the time axis of the voice signal.

Incidentally, when heavy ambient noise is present in the voice signal, the characteristics of the voice signal are damaged by the noise, so that it is difficult to detect the voice section. For example, when a signal to noise ratio (SNR) is 0 dB, the signal and the noise have the same energy, whereby the noise and the voice section may not be distinguished from each other through the energy.

When the speaker recognition or the voice recognition is performed on all signals input to the system, a correct result may not be output and unnecessary power consumption may occur in the system. The system needs to extract only voice generated from a desired position by ignoring voice generated from an undesired position and noise which is not voice and is generated from a desired position. When voice generated from a different position and undesired noise (including undesired voice) are simultaneously input, an existing voice section detection algorithm exerts very low performance. Furthermore, when the speaker says something from a desired position while seeing a different position, there is a problem in that speech recognition is performed without distinguishing this even if there is high possibility that it is not the voice desired by the system.

SUMMARY OF INVENTION

Technical Problem

Accordingly, a first technical object to be attained by the invention is that it provides a method for detecting a time-space voice section using audio and video information capable of improving performance of a speech recognition system by detecting a voice section in consideration of a speaker's face direction and a position of a sound source to be recognized.

A second technical object to be attained by the invention is that it provides an apparatus for detecting a time-space voice section using audio and video information capable of improving performance of a speech recognition system by detecting a voice section in consideration of a speaker's face direction and a position of a sound source to be recognized.

Solution to Problem

In order to attain the first technical object, according to one embodiment of the invention, there is provided a method for detecting a time-space voice section using audio and video information, including: detecting a voice section from an audio signal input to a microphone array; performing speaker verification in the detected voice section; detecting a speaker's face by using a video signal input to a camera and estimating a speaker's face direction when the speaker verification succeeds; and determining the detected voice section as a speaker's voice section when the estimated face direction matches a previously stored reference direction.

Preferably, in the detecting the voice section, a position of a sound source may be estimated by using the audio signal input to the microphone array and noise may be distinguished by comparing the estimated position of the sound source and a previously stored reference position with each other. In this case, in the performing the speaker verification, a value of the reference position may be changed as the estimated position of the sound source when the speaker verification succeeds. Meanwhile, the estimating the position of the sound source may be using a signal with a certain SNR or more in the audio signal input to the microphone array. Meanwhile, in the detecting the voice section, the distinguished noise may be removed and a voice section may be detected on the basis of a single microphone in the signal of which the noise is removed. In the removing the distinguished noise, a signal of a sound source estimated as a position different from the previously stored position may be removed.

In order to attain the first technical object, according to another embodiment of the invention, there is provided a method for detecting a time-space voice section using audio and video information, including: estimating a position of a sound source by using an audio signal input to a microphone array; detecting a voice section in the audio signal when the estimated position of the sound source does not match a previously stored reference position by a threshold value or more after comparing them each other; performing speaker verification in the detected voice section; detecting a speaker's face using a video signal input to a camera and estimating a speaker's face direction when the speaker verification succeeds; and determining the detected voice section as a speaker's voice section when the estimated face direction matches the previously stored reference direction.

Preferably, in performing the speaker verification, the value of the reference position may be changed as the estimated position of the sound source when the speaker verification succeeds.

In order to attain the second technical object, according to one embodiment of the invention, there is provided an apparatus for detecting a time-space voice section using audio and video information, including: a voice section detection unit that detects a voice section in an audio signal input to a microphone array; a speaker verification unit that performs speaker verification in the detected voice section; and a face direction verification unit that detects a speaker's face using a video signal input to a camera and estimates a speaker's face direction when the speaker verification succeeds and determines the detected voice section as a speaker's voice section when the estimated face direction matches a previously stored reference direction.

In order to attain the second technical object, according to another embodiment of the invention, there is provided an apparatus for detecting a time-space voice section using audio and video information, including: a sound source position tracking unit that estimates a position of a sound source by using an audio signal input to a microphone array; a voice section detection unit that detects a voice section in the audio signal when the estimated position of the sound source does not match the previously stored reference position by a threshold value or more after comparing them each other; a speaker verification unit that performs speaker verification in the detected voice section; and a face direction verification unit that detects a speaker's face using a video signal input to a camera and estimates a speaker's face direction when the speaker verification succeeds and determines the detected voice section as a speaker's voice section when the estimated face direction matches a previously stored reference direction.

Preferably, the speaker verification unit may change a value of the reference position as the position of the estimated sound source when the speaker verification succeeds.

Advantageous Effects of Invention

According to the invention, it is possible to improve performance of a speech recognition system by detecting a voice section in consideration of a direction and a position of a speaker to be recognized and perform an adaptive operation when the position of the speaker deviates from an expected position of the system.

DESCRIPTION OF EMBODIMENTS

Figure 1:
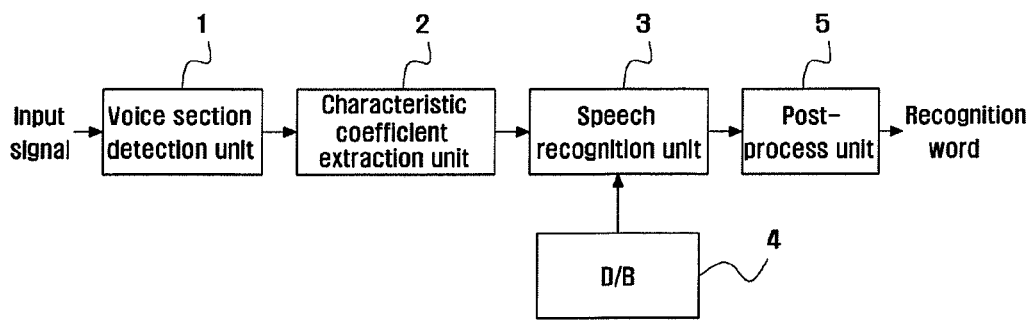
FIG. 1 illustrates an existing speech recognition system.

Hereinafter, preferred embodiments of the invention will be described by referring to the drawings. However, the embodiments of the invention to be exemplified below may be modified into various different forms, and the scope of the invention is not limited to the embodiments to be described later.

In a method for extracting a voice section according to one embodiment of the invention, it is assumed that a speech recognition system knows a voice generation point in advance or knows a signal generation position through a voice source position tracking technique. The system ignores noise generated from a desired position and searches for only a voice generated in desired position and direction. In order to detect a voice section from a voice and noise simultaneously input to a microphone, it is desirable to use a microphone array. Since the microphone array may search for a sound source position using a plurality of microphones, it has an advantage in that a large amount of information items may be utilized.

Figure 2:
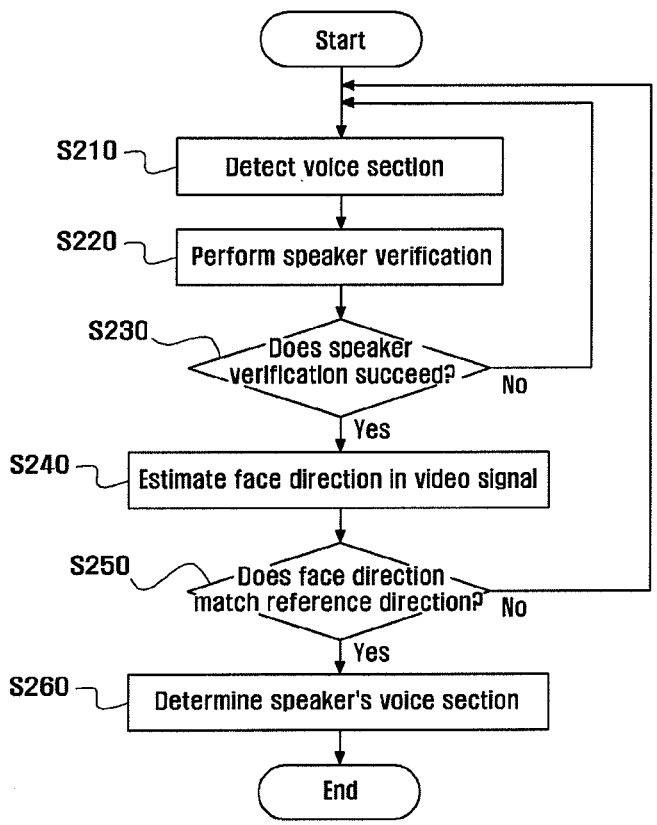
FIG. 2 is a flowchart illustrating a method for detecting a time-space voice section using audio and video information according to one embodiment of the invention.

FIG. 2 is a flowchart illustrating a method for detecting a time-space voice section using audio and video information according to one embodiment of the invention.

First, a voice section is detected from an audio signal input to the microphone array (S210). In this step, a voice section may be searched for from a signal with a certain signal-to-noise ratio (SNR) or more using signal strength.

Next, speaker verification is performed in the detected voice section (S220). The speaker verification is performed in a manner such that a desired speaker's voice model is constructed in advance in the system and a voice signal input to the system is compared with the previously constructed voice model.

Next, when the speaker verification succeeds (S230), a speaker's face is detected using a video signal input to a camera and a speaker's face direction is estimated (S240). When the speaker verification fails, the voice section detection step (S210) starts again.

Next, when the speaker's face direction estimated using the video signal matches a reference direction stored in advance in the system (S250), the voice section detected in the voice section detection step (S210) is determined as the desired speaker's voice section (S260). When the speaker's face direction estimated using the video signal does not match the reference direction stored in advance in the system, the voice section detection step (S210) starts again.

Figure 3:
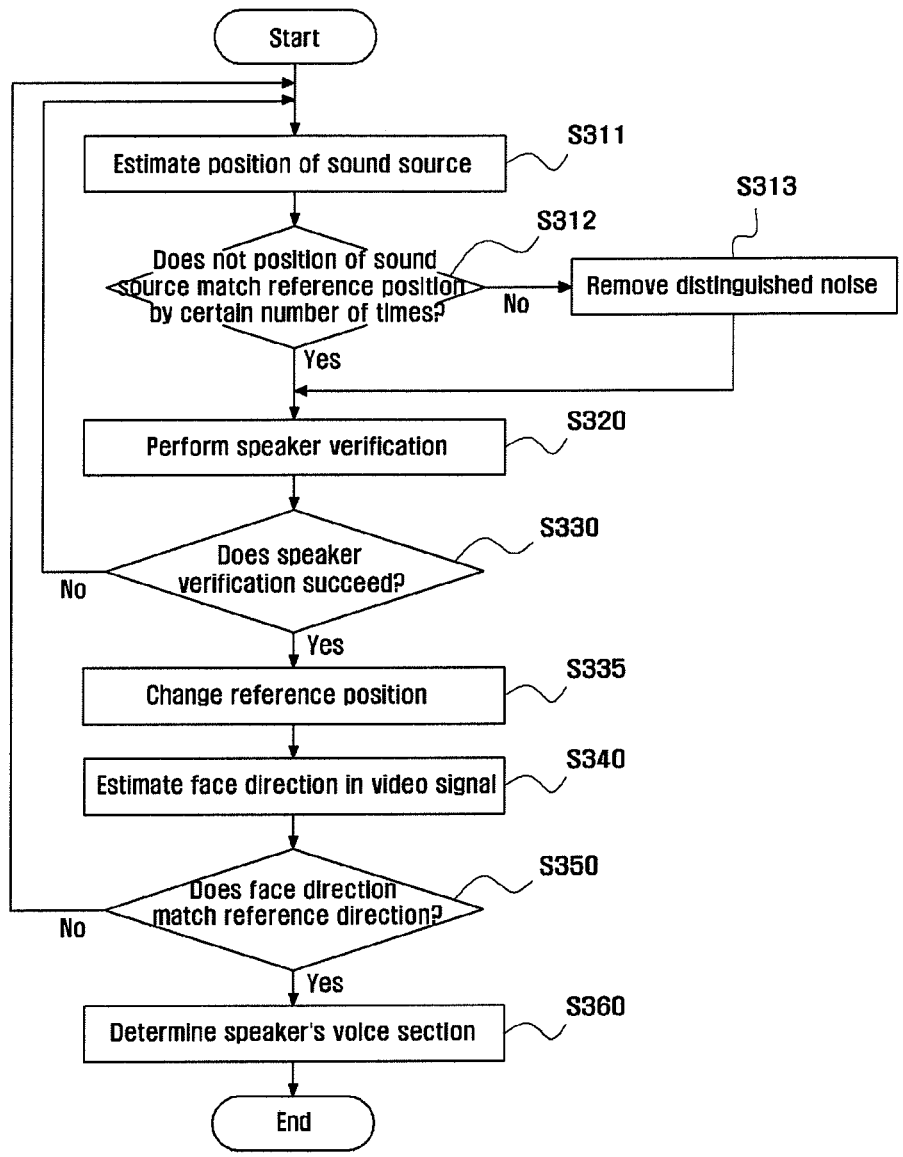
FIG. 3 is a flowchart illustrating a method for detecting a time-space voice section using audio and video information according to another embodiment of the invention.

FIG. 3 is a flowchart illustrating a method for detecting a time-space voice section using audio and video information according to another embodiment of the invention.

First, a position of a sound source is estimated by using an audio signal input to the microphone array (S311).

Next, it is determined whether the position of the sound source estimated above does not match the reference position stored in advance in the system by a certain number of times or more after comparing them with each other (S312). At this time, when they do not match each other by less than a certain number of times, the corresponding signal is determined as noise or removed (S313). When they do not match each other by less than a certain number of times, a step of searching for a sound source matching the reference position may be performed.

Subsequently, the voice section may be detected. Preferably, the voice section may be searched for from a signal with a certain SNR or more using signal strength.

Next, the speaker verification is performed in the detected voice section (S320). The speaker verification is performed in a manner such that a desired speaker's voice model is constructed in advance in the system and the voice signal input to the system is compared with the previously constructed voice model.

When the speaker verification succeeds (S330), the reference position stored in advance in the system is changed as the estimated position of the sound source (S335).

Next, the speaker's face is detected by using the video signal input to the camera, and the speaker's face direction is estimated (S340). When the speaker verification fails, the sound source position estimation step (S311) starts again.

When the speaker's face direction estimated by using the video signal matches the reference direction stored in advance in the system (S350), the detected voice section is determined as the desired speaker's voice section (S360) while estimating the voice source position (S311). When the speaker's face direction estimated using the video signal does not match the reference direction stored in advance in the system, the sound source position estimation step (S311) starts again.

Figure 4:
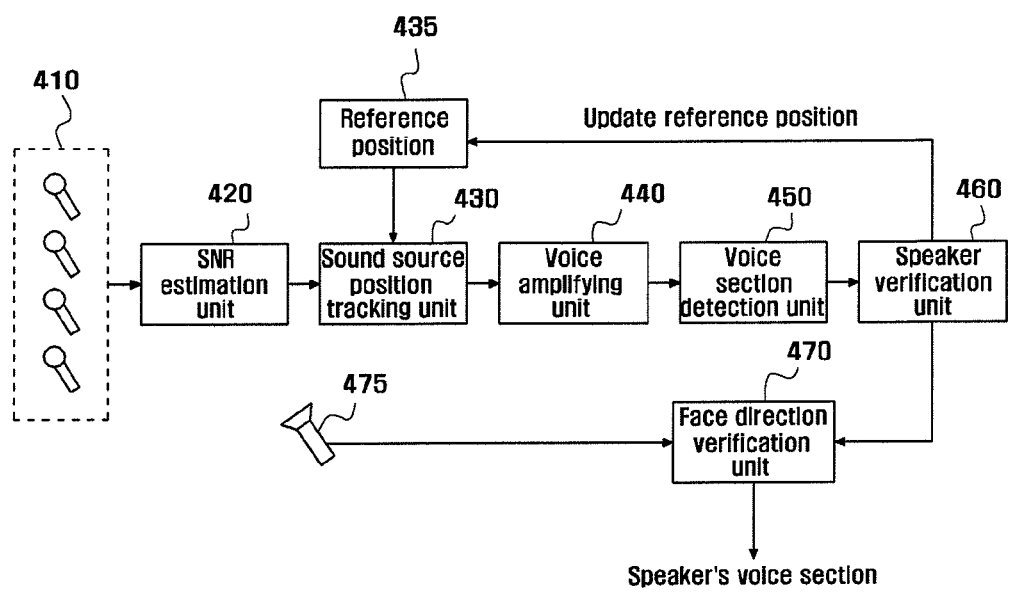
FIG. 4 is a block diagram illustrating an apparatus for detecting a time-space voice section using audio and video information according to still another embodiment of the invention.

FIG. 4 is a block diagram illustrating an apparatus for detecting a time-space voice section using audio and video information according to still another embodiment of the invention.

A microphone array (410) includes a plurality of microphones and receives an audio signal.

An SNR estimation unit (420) obtains an SNR of the audio signal by using strength of the audio signal input to the microphone array (410). It is desirable to search for a voice section only from a signal with a certain SNR or more.

A sound source position tracking unit (430) tracks the position of the sound source by using the audio signal input to the microphone array. Even in this case, it is desirable to track the position of the source only from the signal with a certain SNR or more. The sound source position tracking unit (430) may determine whether the corresponding sound source is noise after comparing the estimated position of the sound source with the reference position stored in advance in the system. The sound source position tracking unit (430) may remove a signal (noise including voice) in a direction which is not desired after comparing the reference position with the estimated position of the sound source.

When an error continuously occurs in a certain direction in the sound source position tracking unit (430), a voice amplifying unit (440) may amplify voice in the signal of the corresponding direction. That is, even in the direction which is not expected by the system, when a speaker's voice signal is continuously generated in a different direction, the voice signal in the corresponding direction is accepted as a proper voice signal instead of noise. In this case, a speaker verification unit (460) applies a speaker verification technique to the signal accepted as the proper voice signal, and changes the reference direction stored in the system when the corresponding signal is the speaker to be recognized by the system. Therefore, the system may perform the voice recognition while tracking the position of the speaker to be recognized.

Meanwhile, the reference position used as a reference value in the sound source position tracking unit (430) may be stored in storage means (435).

The voice amplifying unit (440) amplifies the voice of the transmitted audio signal and removes noise therefrom. As an example of a method for amplifying the voice, there is a method for amplifying a specific frequency bandwidth.

The voice section detection unit (450) applies the voice amplified in the voice amplifying unit (440) to a voice section detection technique based on a single microphone. The reason why the voice is amplified in the voice amplifying unit (440) is because the voice section detection technique exhibits better performance at a high SNR.

When the voice section detection unit (450) determines a voice section, the speaker verification unit (460) performs the speaker verification and determines whether the signal is the desired speaker's voice.

When the speaker is determined as a user to be recognized in the speaker verification unit (460), a face direction verification unit (470) detects a face in a video signal input to a camera (475) and estimates the face direction. When the estimated face direction is a direction where the system is positioned, the face direction verification unit (470) recognizes the voice section detected in the voice section detection unit (450) as a voice section of the speaker to be recognized.

The invention may be performed through software. Preferably, a program causing a method for detecting a time-space voice section using audio and video information according to one embodiment of the invention to be executed by a computer may be provided while being recorded in a recording medium readable by the computer. When the invention is performed by software, means constituting the invention are code segments executing necessary operations. The program or the code segments may be stored in a processor readable medium or may be transmitted by a computer data signal combined with a carrier wave through a transmission medium or a communication network.

The computer readable recording medium includes all types of recording devices storing data readable by a computer system. Examples of the recording device readable by the computer include a ROM, a RAM, a CD-ROM, a DVD±ROM, a DVD-RAM, a magnetic tape, a floppy disk, a hard disk, an optical data storage device, and the like. Furthermore, the recording medium readable by the computer may be distributed in computer devices connected to each other via a network, and codes readable by the computer in a distribution system may be stored therein and executed.

The invention has been described by referring to embodiments shown in the drawings, but this is merely an example. It should be understood by the person having general knowledge in the corresponding field that various modifications and modifications of the embodiments may be made. And, such modifications are included in the technical protection scope of the invention. Accordingly, the real technical protection scope of the invention is determined by the technical spirit of the appended claims.

INDUSTRIAL APPLICABILITY

The invention relates to a method and an apparatus for detecting a voice section using time-space data in a speech recognition field, and may be applied to a speech recognition apparatus capable of improving performance of a speech recognition system by detecting a voice section in consideration of a position and a direction of a speaker to be recognized and a system including the same.

The invention claimed is:

1. A method for detecting a time-space voice section using audio and video information, comprising:
    detecting a voice section from an audio signal input to a microphone array;
    performing speaker verification by comparing the detected voice section to a voice model constructed in advance;
    detecting a speaker's face by using a video signal input to a camera in response to the verification of the voice section;
    estimating a speaker's face direction based on the direction of the speaker's face in the video signal; and
    determining the detected voice section as a speaker's voice section for voice recognition when the estimated face direction matches a previously stored reference direction so that voices generated from speakers that do not match the previously stored reference direction are not recognized,
    wherein the detecting the voice section includes:
    estimating a position of a sound source by using the audio signal input to the microphone array;
    distinguishing noise by comparing the estimated position of the sound source and the previously stored reference direction with each other
    removing the distinguished noise; and
    detecting a voice section on the basis of a single microphone in the signal of which the noise is removed.

2. The method for detecting the time-space voice section using the audio and video information according to claim 1,
    wherein the performing the speaker verification includes:
    changing a value of the reference position as the estimated position of the sound source when the speaker verification succeeds.

3. The method for detecting the time-space voice section using the audio and video information according to claim 1,
    wherein the estimating the position of the sound source is using a signal with a certain SNR or more in the audio signal input to the microphone array.

4. The method for detecting the time-space voice section using the audio and video information according to claim 1,
    wherein the removing the distinguished noise includes:
    removing a signal of a sound source estimated as a position different from the previously stored position.

5. A method for detecting a time-space voice section using audio and video information, comprising:
    estimating a position of a sound source by using an audio signal input to a microphone array;
    detecting a voice section in the audio signal in an instance in which the estimated position of the sound source does not match a previously stored reference direction by at least a threshold value;
    performing speaker verification by comparing the detected voice section to a voice model constructed in advance;
    detecting a speaker's face using a video signal input to a camera in response to the verification of the voice section;
    estimating a speaker's face direction based on the direction of the speaker's face in the video signal; and
    determining the detected voice section as a speaker's voice section for voice recognition when the estimated face direction matches the previously stored reference direction so that voices generated from speakers that do not match the previously stored reference direction are not recognized,
    wherein the detecting the voice section includes:
    estimating a position of a sound source by using the audio signal input to the microphone array;
    distinguishing noise by comparing the estimated position of the sound source and the previously stored reference direction with each other
    removing the distinguished noise; and
    detecting a voice section on the basis of a single microphone in the signal of which the noise is removed.

6. The method for detecting the time-space voice section using the audio and video information according to claim 5,
    wherein the performing the speaker verification includes:
    changing a value of the reference position as the estimated position of the sound source when the speaker verification succeeds.

7. The method for detecting a time-space voice section using audio and video information according to claim 5,
    wherein the removing the distinguished noise includes:
    removing a signal of a sound source estimated as a position different from the previously stored position.

8. An apparatus for detecting a time-space voice section using audio and video information, comprising:
    a voice section detection unit configured to detect a voice section in an audio signal input to a microphone array;
    a speaker verification unit configured to perform speaker verification by comparing the detected voice section to a voice model constructed in advance; and
    a face direction verification unit configured to detect a speaker's face using a video signal input to a camera in response to the verification of the voice section, configured to estimate a speaker's face direction based on the direction of the speaker's face in the video signal, and configured to determine the detected voice section as a speaker's voice section for voice recognition when the estimated face direction matches a previously stored reference direction so that voices generated from speakers that do not match the previously stored reference direction are not recognized,
    wherein the detecting the voice section includes:
    estimating a position of a sound source by using the audio signal input to the microphone array;
    distinguishing noise by comparing the estimated position of the sound source and the previously stored reference direction with each other
    removing the distinguished noise; and
    detecting a voice section on the basis of a single microphone in the signal of which the noise is removed.

9. The apparatus for detecting a time-space voice section using audio and video information according to claim 8,
    wherein the removing the distinguished noise includes:
    removing a signal of a sound source estimated as a position different from the previously stored position.

10. An apparatus for detecting a time-space voice section using audio and video information, comprising:
    a sound source position tracking unit configured to estimate a position of a sound source by using an audio signal input to a microphone array;
    a voice section detection unit configured to detect a voice section in the audio signal in an instance in which the estimated position of the sound source does not match a previously stored reference direction by at least a threshold value;

a speaker verification unit configured to perform speaker verification by comparing the detected voice section to a voice model constructed in advance; and a face direction verification unit configured to detect a speaker's face using a video signal input to a camera in response to the verification of the voice section, configured to estimate a speaker's face direction based on the direction of the speaker's face in the video signal, and configured to determine the detected voice section as a speaker's voice section for voice recognition when the estimated face direction matches the previously stored reference direction so that voices generated from speakers that do not match the previously stored reference direction are not recognized ignored, wherein the detecting the voice section includes:

estimating a position of a sound source by using the audio signal input to the microphone array;

distinguishing noise by comparing the estimated position of the sound source and the previously stored reference direction with each other removing the distinguished noise; and detecting a voice section on the basis of a single microphone in the signal of which the noise is removed.

11. The apparatus for detecting the time-space voice section using the audio and video information according to claim 10, wherein the speaker verification unit is configured to change a value of the reference position as the position of the estimated sound source when the speaker verification succeeds.

12. The apparatus for detecting a time-space voice section using audio and video information according to claim 10, wherein the removing the distinguished noise includes:

removing a signal of a sound source estimated as a position different from the previously stored position.

13. A computer program product comprising at least one non-transitory computer-readable storage medium having computer-executable program code portions stored therein, the computer-executable program code portions comprising program code instructions for:

detecting a voice section from an audio signal input to a microphone array;

performing speaker verification by comparing the detected voice section to a voice model constructed in advance;

detecting a speaker's face by using a video signal input to a camera in response to the verification of the voice section;

estimating a speaker's face direction based on the direction of the speaker's face in the video signal; and determining the detected voice section as a speaker's voice section for voice recognition when the estimated face direction matches a previously stored reference direction so that voices generated from speakers that do not match the previously stored reference direction are not recognized, wherein the detecting the voice section includes:

estimating a position of a sound source by using the audio signal input to the microphone array;

distinguishing noise by comparing the estimated position of the sound source and the previously stored reference direction with each other removing the distinguished noise; and detecting a voice section on the basis of a single microphone in the signal of which the noise is removed.

14. The computer program product according to claim 13, wherein the removing the distinguished noise includes:

removing a signal of a sound source estimated as a position different from the previously stored position.

15. A computer program product comprising at least one non-transitory computer-readable storage medium having computer-executable program code portions stored therein, the computer-executable program code portions comprising program code instructions for:

estimating a position of a sound source by using an audio signal input to a microphone array;

detecting a voice section in the audio signal in an instance in which the estimated position of the sound source does not match a previously stored reference direction by at least a threshold value;

performing speaker verification by comparing the detected voice section to a voice model constructed in advance;

detecting a speaker's face using a video signal input to a camera in response to the verification of the voice section;

estimating a speaker's face direction based on the direction of the speaker's face in the video signal; and determining the detected voice section as a speaker's voice section for voice recognition when the estimated face direction matches the previously stored reference direction so that voices generated from speakers that do not match the previously stored reference direction are not recognized, wherein the detecting the voice section includes:

estimating a position of a sound source by using the audio signal input to the microphone array;

distinguishing noise by comparing the estimated position of the sound source and the previously stored reference direction with each other removing the distinguished noise; and detecting a voice section on the basis of a single microphone in the signal of which the noise is removed.

16. The computer program product according to claim 15, wherein the removing the distinguished noise includes:

removing a signal of a sound source estimated as a position different from the previously stored position.

* * * * *